United States Patent
Morimoto (10) Patent No.: US 8,027,387 B2
(45) Date of Patent: Sep. 27, 2011

(54) MOVING PICTURE CODING APPARATUS UTILIZING A DCT COEFFICIENT FOR PERFORMING INTRA-CODING

(75) Inventor: Masami Morimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1547 days.

(21) Appl. No.: 11/416,940

(22) Filed: May 3, 2006

(65) Prior Publication Data

US 2006/0256870 A1 Nov. 16, 2006

(30) Foreign Application Priority Data

May 11, 2005 (JP) .................... 2005-138669

(51) Int. Cl.
*H04N 7/12* (2006.01)
*H04N 11/02* (2006.01)
*H04N 11/04* (2006.01)

(52) U.S. Cl. .................................................. 375/240.2

(58) Field of Classification Search .............. 375/240.16, 375/240.01

See application file for complete search history.

(56) References Cited

U.S. PATENT DOCUMENTS

| 4,803,703 | A  | * | 2/1989  | DeLuca et al. ............... 375/368 |
| 6,658,058 | B1 | * | 12/2003 | Kuroda et al. ........... 375/240.12 |
| 6,658,618 | B1 | * | 12/2003 | Gu et al. ...................... 714/746 |
| 6,907,072 | B2 |   | 6/2005  | Kawakatsu et al. |
| 2003/0112864 | A1 | * | 6/2003 | Karczewicz et al. .... 375/240.01 |
| 2005/0175099 | A1 | * | 8/2005 | Sarkijarvi et al. ....... 375/240.16 |

FOREIGN PATENT DOCUMENTS

JP  2001-169286 A  6/2001

* cited by examiner

*Primary Examiner* — Young Lee
*Assistant Examiner* — James Pontius
(74) *Attorney, Agent, or Firm* — Holtz, Holtz, Goodman & Chick, PC (57) ABSTRACT

In a moving picture coding apparatus, a first determining section determines whether the parameter is less than or equal to a predetermined threshold and a first measuring section, for each divided blocks, measures time duration while the first determining section is determining that the parameter is less than or equal to the predetermined threshold. After that, a second determining section determines whether the time duration comes up to a predetermined condition. Then, a coding control section forcibly sets intra-coding for a block, if the second measuring section determined that the time duration has come up to the condition.

9 Claims, 4 Drawing Sheets

FIG. 4

MOVING PICTURE CODING APPARATUS UTILIZING A DCT COEFFICIENT FOR PERFORMING INTRA-CODING

CROSS REFERENCE TO RELATED APPLICATION

Thin application is based upon the benefit of priority from the prior Japanese Application No. P2002-138669, filed May 11, 2005, the entire contents of which are incorporated herein by reference.

FIELD OF THE INVENTION

The present invention relates to a moving picture coding apparatus.

DESCRIPTION OF THE BACKGROUND

The basic band-type compression and coding scheme for moving pictures includes predictive coding and transform coding. The high-efficiency coding is enabled utilizing known statistical characteristics of video signals, i.e., a correlation found existing between inter-picture pixels, and between intra-picture pixels. The predictive coding is utilizing the correlation in a time domain, and the transform coding is utilizing the correlation in a frequency domain.

The predictive coding is a scheme for coding a differential signal with a predictive picture derived by motion compensation prediction. The transform coding is a scheme for transforming pixel-based screen blocks into the frequency domain by Discrete Cosine Transform (DCT), and a transform coefficient of the resulting frequency components is quantized for transmission. Such a transform coefficient is hereinafter referred to as DCT coefficient. The recently-popular scheme is the combination of these two types of coding. For example, in ITU-T (International Telecommunication Union-Telecommunication Standardization Sector) recommendation H.261 and H.263, or MPEG (Moving Picture Experts Group) as a working group of ISO (International Organization for Standardization) for picture compression, coding is performed for every 16-by-16 pixel block. Such a pixel block is hereinafter referred to as a macroblock.

In a moving picture coding device on the transmission end, coding is performed using motion compensation prediction, and thus a frame memory stores pictures being more or less different from original pictures. In this sense, after a predetermined length of time, the difference from the original pictures is increased, and eventually stored is picture data that is considerably different from the original pictures. If the resulting macroblock picture data is used for motion compensation of any neighboring blocks, the erroneous data is spread out in the neighborhood.

The prediction coding is a scheme for transmitting only a predictive error signal, and by accumulating the predictive error signal in a moving picture decoding device on the transmission-destination end, reproducing a picture signal. With such a configuration, if any coding error occurs in the transmission path, the erroneous picture data is input into a frame memory in the moving picture decoding device on the reception end. As a result, the original picture data stored in the frame memory is corrupted. Such picture corruption does not occur only to the original picture data in the frame memory but to any other subsequently incoming picture data because variable length data becomes out of sync. Therefore, in the moving picture decoding device, even if the subsequently incoming data is free from error, the correct picture data cannot be decoded and reproduced until the error effects are reset follows:

In consideration thereof, a conventional method has been proposed in which a differential value is derived between a predictive picture and a current picture for every macroblock. In the method, any macroblock with the differential value being a specific reference value or larger is refreshed by intra coding, and to any macroblock with the differential value being smaller than the reference value, inter coding is performed. In such a method, the macroblocks are refreshed every time any change of the reference value or more is observed in the picture motion so that picture quality deterioration can be prevented relatively in the early stages. As an example, refer to Patent Document 1 (JP-A-2001-169286; paragraphs of 0012 and 0013).

The problem here is that, with such conventional refreshing, if any transmission error is found in a specific macroblock during intra coding, the macroblock is not refreshed for a long time unless the picture in the macroblock is observed with any motion of the reference value or more. As a result, picture deterioration caused by the transmission error remains for a long period of time.

For the purpose of solving such a problem, another method is proposed in which every macroblock is unconditionally refreshed at regular intervals. The problem with this method is that intra coding is large in data amount for coding. Therefore, as described above, if refreshing is unconditionally performed to every macroblock, the coding efficiency is considerably reduced.

SUMMARY OF THE INVENTION

One aspect of the invention is to provide a moving picture coding apparatus, which recovers deterioration of a moving picture by using intra-coding.

The present invention may provide a moving picture coding apparatus comprising; a blocking section configured to divide a frame of picture data into a plurality of blocks, a calculating section configured to calculate a parameter which indicates motion volume of picture, a first determining section configured to determine whether the parameter is less than or equal to a predetermined threshold, a first measuring section, for each divided blocks, configured to measure time duration while the first determining section is determining that the parameter is less than or equal to the predetermined threshold, a second determining section configured to determine whether the time duration comes up to a predetermined condition, and a coding control section configured to set intra-coding for a block, if the second measuring section determined that the time duration has come up to the condition.

DESCRIPTION OF THE PREFERRED EMBODIMENT

An embodiment of the present invention will be described with reference to the accompanying drawings.

Figure 1:
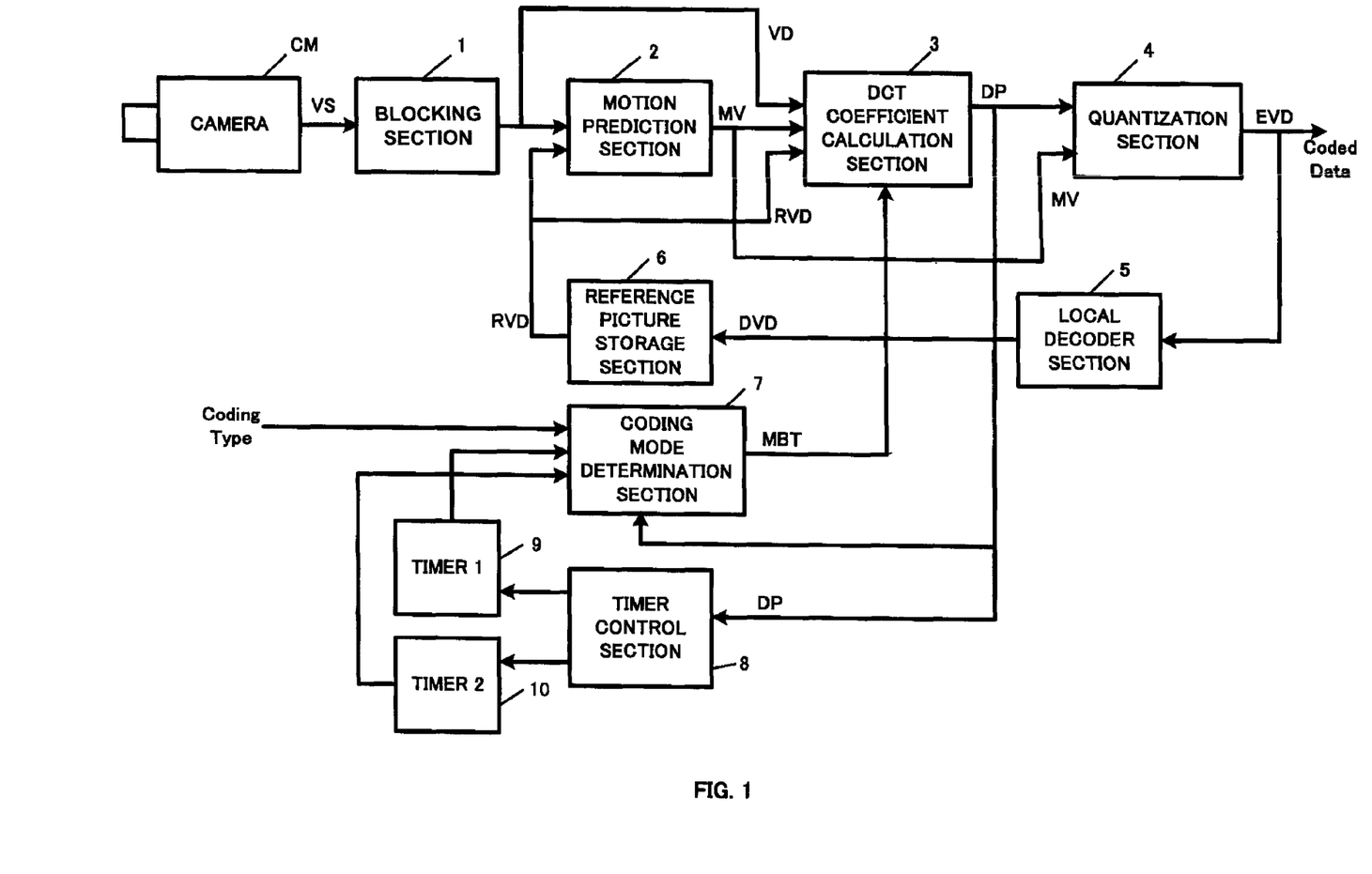
FIG. 1 is a block diagram showing a configuration of a moving picture coding device.

FIG. 1 is a block diagram showing a moving picture coding device in an embodiment of the invention.

The moving picture coding device of this embodiment includes: a blocking section 1; a motion prediction section 2; a discrete cosine transform (DCT) coefficient calculation section 3; a quantization section 4; a local decoder section 5; a reference picture storage section 6; a coding mode determination section 7; a timer control section 8; a first timer section (TIMER 1) 9, and a second timer section (TIMER 2) 10.

Figure 3:
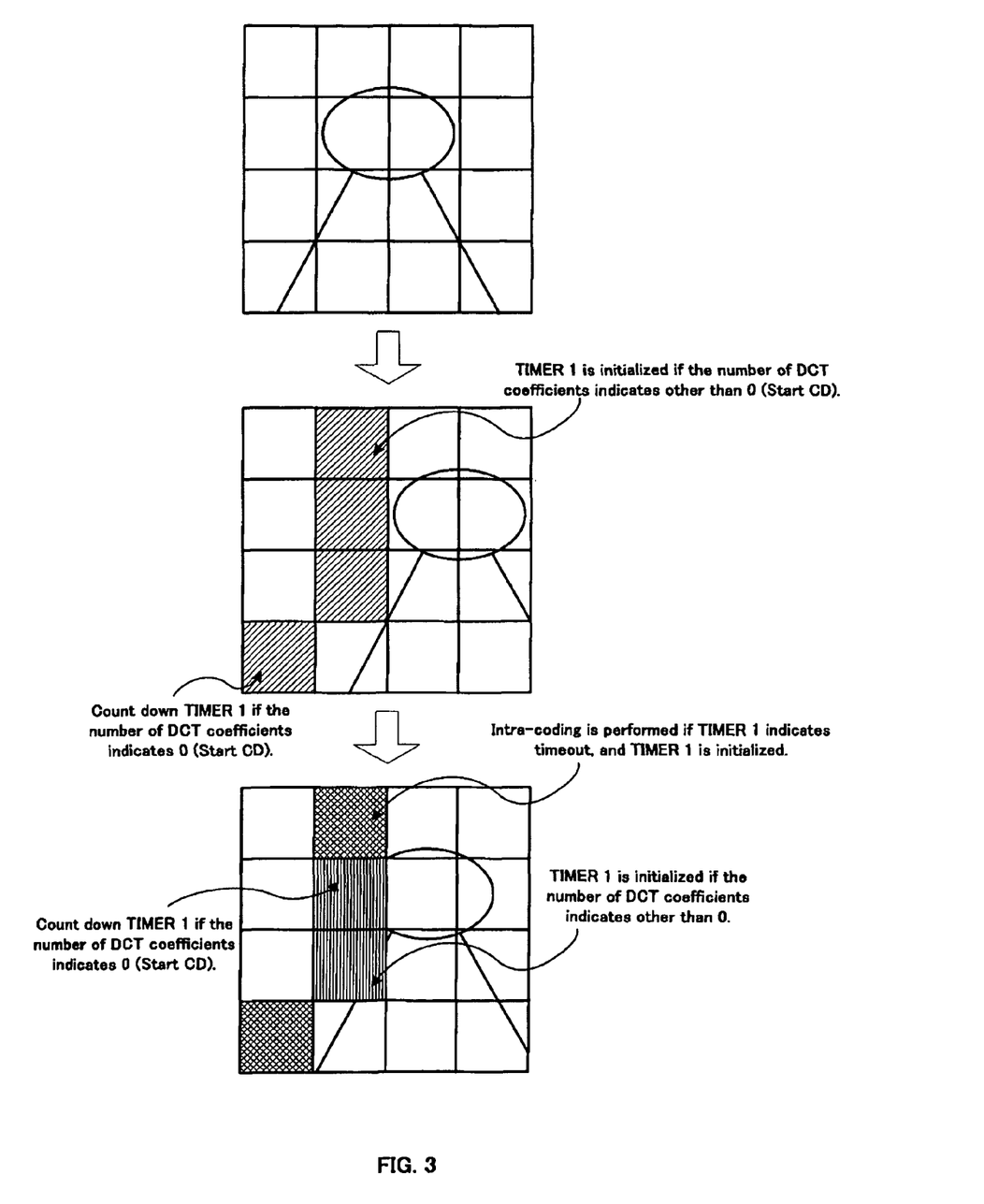
FIG. 3 shows frames of moving picture for explaining an operation of the moving picture coding device.

The blocking section 1 divides each frames of a picture data captured by a camera CM into a plurality of macroblocks. For example, as shown in FIG. 3, the picture data is divided into macroblocks of 4×4=16. The resulting macroblocks are each provided with brightness information about 16×16 pixels, and two color difference information about 8×8 pixels.

In the inter-coding mode, the motion prediction section 2 calculates a motion prediction vector MV for picture data VD on a macroblock basis. The picture data VD is of pictures periodically captured by the camera CM, and such calculation is made with reference to picture data RVD of previous pictures stored in the reference picture storage section 6. The calculated motion prediction vector MV is forwarded to the DCT coefficient calculation section 3.

The DCT coefficient calculation section 3 calculates a DCT coefficient DP through selective use of the picture data VD provided by the camera CM, the motion prediction vector MV calculated by the motion prediction section 2, and the reference picture data RVD stored in the reference picture storage section 6. The calculation of the DCT coefficient DP is made based on a coding mode MBT determined by the coding mode determination section 7, which will be described later.

The quantization section 4 quantizes the DCT coefficient DP calculated by the DCT coefficient calculation section 3. The quantized DCT coefficient is then forwarded to a variable length coding section (not shown) as coded data EVD, and also to the local decoder section 5.

The local decoder section 5 subjects the quantized DCT coefficient to inverse quantization (IQ) and inverse discrete cosine transform (IDCT). The resulting decoding data is then used as a basis to generate reference picture data, and the generated reference picture data is stored in the reference picture storage section 6.

The first timer section 9 is configured by a plurality of watchdog timers corresponding to a plurality of macroblocks of one frame of picture data. These watchdog timers each separately operate to count, and time out when the count value reaches "0". The second timer section 10 is configured by a plurality of cumulative timers corresponding to a plurality of macroblocks of one frame of picture data. These cumulative timers also each separately operate to count, and time out when the count value reaches "0". Herein, the watchdog timers in the first timer section 9 are set to "20" for their count values, and the cumulative timers in the second timer section 10 are set to "3" therefor, for example.

The timer control section 8 determines whether the number of the DCT coefficients DP is equal to or smaller than a first threshold value. Such a determination is made by comparing the number of the DCT coefficients DP calculated for every macroblock by the DCT coefficient calculation section 3 with the first threshold value, e.g., "0". When the number of the DCT coefficients DP is equal to or smaller than the first threshold value, any corresponding watchdog timer in the first timer section 9 is made to start counting down. On the other hand, when the number of the DCT coefficients DP is exceeding the first threshold value, any corresponding watchdog timer is initialized.

The timer control section 8 also determines whether the number of the DCT coefficients DP is larger than a second threshold value. Such a determination is made by comparing the number of the DCT coefficients DP calculated for every macroblock by the DCT coefficient calculation section 3 with the second threshold value, which is set larger than the first threshold value, e.g., "10". When the number of the DCT coefficients DP is larger than the second threshold value, any corresponding cumulative timer in the second timer section 10 is made to start counting down. On the other hand, when the number of the DCT coefficients DP is equal to or smaller than the second threshold value, any corresponding cumulative timer is not made to start counting down but to keep the current count value.

The coding mode determination section 7 determines, for every macroblock, whether the macroblock is set to inter-coding or intra-coding for the coding mode. Such a determination is made based on the coding type specified by the camera CM or an operation section that is not shown, the number of the DCT coefficients DP calculated by the DCT coefficient calculation section 3, and the operation state of the timers configuring the first and second timer sections 9 and 10. The determined coding mode MBT is then provided to the DCT coefficient calculation section 3.

Figure 2:
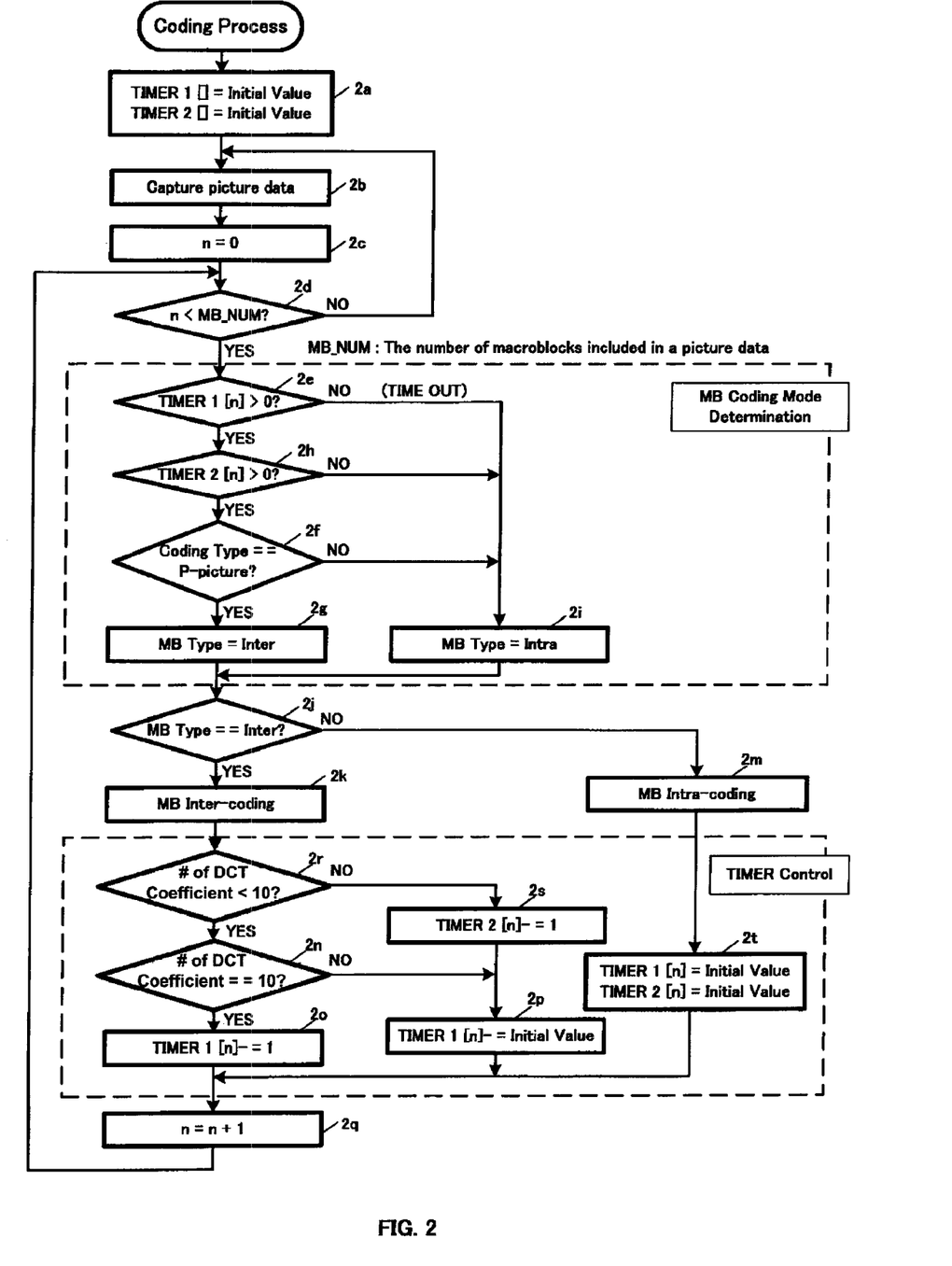
FIG. 2 is a flowchart showing an operation of the moving picture coding device.

Next, the operation of the moving picture coding device configured as above will be described. FIG. 2 is a flowchart showing the operation procedure and details of the moving picture coding device.

Once a coding process is started, first in step 2a, the timers configuring the first and second timer sections 9 and 10 are initialized with count value. Then in step 2b, picture data corresponding to one picture is captured by the camera CM. The captured picture data is divided into a plurality of macroblocks by the blocking section 1. The number of macroblocks is represented by MB-NUM.

Then in step 2c, the macroblock number n is reset (n=0) That is, as a coding target macroblock, selected first is the 0th macroblock. In step 2d, the macroblock number n is compared with the macroblock number MB_NUM. As a result of such a comparison, when the macroblock number n is smaller than the macroblock number MB_NUM, a coding mode determination process is accordingly executed. This coding mode determination process is executed by the coding mode determination section 7 as described in detail below.

That is, first in step 2e, a determination is made whether the watchdog timer in the first timer section 9 corresponding to the selected 0th macroblock is larger than "0" in count value. When the determination result indicates that the count value of the watchdog timer is larger than "0", i.e., when no timeout is specified, the procedure goes to step 2h. In step 2h, a determination is made whether the cumulative timer in the second timer section 10 corresponding to the 0th macroblock is larger than "0" in count value. When the determination result indicates that the count value of the cumulative timer is larger than "0", i.e., when no timeout is specified, the procedure goes to step 2f.

In step 2f, a determination is made whether the picture coding type is of P picture or I picture. The picture coding type is specified by a main control section, which is not shown, based on the scene change timing, the user operation, and the count value of a picture counter that is not shown. The user operation is of I picture insertion during coding to enable, at the time of reproduction (decoding), picture fast-forwarding, pausing, rewinding and reproducing, editing, and others. The scene change denotes any change observed in the captured picture as a result of camera switching between those plurally provided. This scene change may be perceived in response to reception of a camera switching signal coming from an external device such as switcher, or may be detected in the moving picture coding device through monitoring of any change of pictures coming from the camera. The picture counter is provided for use for setting a refresh cycle when the pictures are forcibly refreshed periodically. One cycle is set to 132 picture periods, for example.

When the picture coding type is determined as being P picture in step 2f, the procedure goes to step 2g, and the coding mode of the corresponding 0th macroblock is determined to inter coding. On the other hand, when the picture coding type is determined as being I picture in step 2f, the procedure goes to step 2j to determine the coding mode of the corresponding 0th macroblock to intra-coding. That is, when the externally-specified picture coding type is of I picture, the coding mode of the corresponding macroblock is set to intra-coding.

Assuming now is a case where any corresponding watchdog timer in the first timer section 9 is specified as timeout. With this being the case, the procedure goes to step 2i from 2e, and the coding mode of the corresponding 0th macroblock is determined to intra-coding. That is, if no picture motion is detected in the macroblock for the period of successive 20 pictures, for example, irrespective of the externally-specified picture coding type, the intra coding is compulsory selected.

Assuming also is a case where any corresponding cumulative timer in the second timer section 10 is specified as timeout in step 2h. With this being the case, the procedure also goes to step 2i, and the coding mode of the corresponding 0th macroblock is determined to intra coding. That is, also when any large picture change is observed in the corresponding 0th macroblock for the period of 3 pictures successively or intermittently, irrespective of the externally-specified picture coding type, the intra coding is compulsory selected.

After the coding mode is determined for the 0th macroblock as such, if the determined coding mode is inter coding, the procedure goes to step 2k from 2j, and the corresponding 0th macroblock is subjected to inter coding. On the other hand, if the determined coding mode is intra coding, the procedure goes to step 2m from 2j, and the corresponding 0th macroblock is subjected to intra coding.

The inter coding is performed as described in detail below. That is, the inter coding involves motion compensation prediction. In consideration thereof, in the motion prediction section 2, the motion vector is first calculated from the motion-compensated prediction picture data stored in the reference picture storage section 6, and the picture data of the macroblock for the current picture. Using the calculated motion vector and the reference picture data of any corresponding macroblock in a picture preceding to the picture stored in the reference picture storage section 6, prediction picture data is generated for the one-picture-preceding picture data. Thereafter, generated is differential picture data between the picture data of the macroblock in the current picture and the generated prediction picture data.

Thereafter, in the DCT coefficient calculation section 3, the differential picture data is subjected to DCT. The resulting DCT coefficient DP is quantized in the quantization section 4, and the result is output as coded data EVD. The quantized DCT coefficient DP is subjected to dequantization and IDCT in the local decoder section 5. The resulting generated decoding data DVD is stored in the reference picture storage section 6 as the reference picture data. The stored reference picture data is used for motion compensation prediction of any subsequent pictures.

The intra coding is performed as described in detail below. That is, the intra coding involves no motion compensation prediction. In consideration thereof, picture data of macroblocks cut out by the block cut-out section 1 is input to the DCT coefficient calculation section 3 as it is. In the DCT coefficient calculation section 3, the input picture data of the current picture is subjected to DCT, and the resulting DCT coefficient is quantized by the quantization section 4.

After the inter or intra coding is through, the timer control section 8 goes through a timer control process as below. That is, first in step 2r, the number of the DCT coefficients DP calculated by the DCT coefficient calculation section 3 is compared with the second threshold value. For example, the second threshold value is set to "10", and the number of the DCT coefficients DP as the calculation result is compared with the set value of "10". When the comparison result tells that the number of the DCT coefficients DP is smaller than "10", it is determined that the corresponding 0th macroblock has no or little picture motion if any.

Then in step 2n, the number of the DCT coefficients DP calculated by the DCT coefficient calculation section 3 is compared with the first threshold value. In this case, the first threshold value is set to "0", and the number of the DCT coefficients DP as the calculation result is compared with the set value of "0". When the comparison result tells that the number of the DCT coefficients DP is "0", it is determined that the corresponding 0th macroblock has no picture motion at all, and in step 2o, a process is executed to count down the count value of the corresponding watchdog timer.

Assuming here is a case where the number of the DCT coefficients DP is determined as being smaller than "10" in step 2r, and where the number of the DCT coefficients DP is determined as being larger than "0" in step 2n. In this case, it is determined that a small motion is observed in the picture of the corresponding 0th macroblock, and a process is executed to initialize the count value of the corresponding watchdog timer in step 2p.

On the other hand, assumed is another case that the number of the DCT coefficients DP is determined in step 2r as not being smaller than "10", i.e., being equal to "10" or larger. In this case, the corresponding 0th macroblock is determined as being observed with large picture motion, and thus the count value of the corresponding cumulative timer is counted down in step 2s. That is, the frequency of large picture motion is counted by the cumulative timer. At this time, the count value of the watchdog timer corresponding to the same macroblock is initialized in step 2p.

When intra-coding is performed in step 2m, in step 2t, the watchdog timer in the first timer section 9 and the cumulative timer in the second timer section 10 are both initialized.

After such control is applied to the watchdog timer and the cumulative timer, the macroblock number n is incremented (n=n+1) in step 2q, whereby the next macroblock is selected. The procedure then returns to step 2d, and from step 2d to 2p, the newly selected macroblock (n=the first macroblock) is subjected to the coding process. Thereafter, in the similar manner, every time any selected one macroblock is through with the coding process, the procedure returns to step 2d to repeat the coding process to the next selected macroblock.

After every macroblock configuring a picture is through with the coding process, the procedure returns from step 2d to 2b so that the next picture is acquired. With respect to this new picture, the coding process is repeated on a macroblock basis following the above-described procedure.

As such, with the moving picture coding device of this embodiment, in the normal operation state, every macroblock is determined whether the coding mode is inter coding or intra coding based on the picture coding type that is specified from the outside with the picture cycle. Based on the determination result, the picture data of the corresponding macroblock is subjected to inter coding or intra coding.

On the other hand, in the normal operation state, assumed here is a case where the watchdog timer in the first timer section 9 times out in a specific picture. With this being the case, for the coding mode determination section 7, the procedure goes to step 2i from 2e. In step 2i, the coding mode for the corresponding macroblock is determined to intra-coding. Thereafter, the intra-coding is performed to the macroblock. That is, even if the externally-specified picture coding type is of P picture, the intra-coding is forcibly applied to this macroblock.

Figure 4:
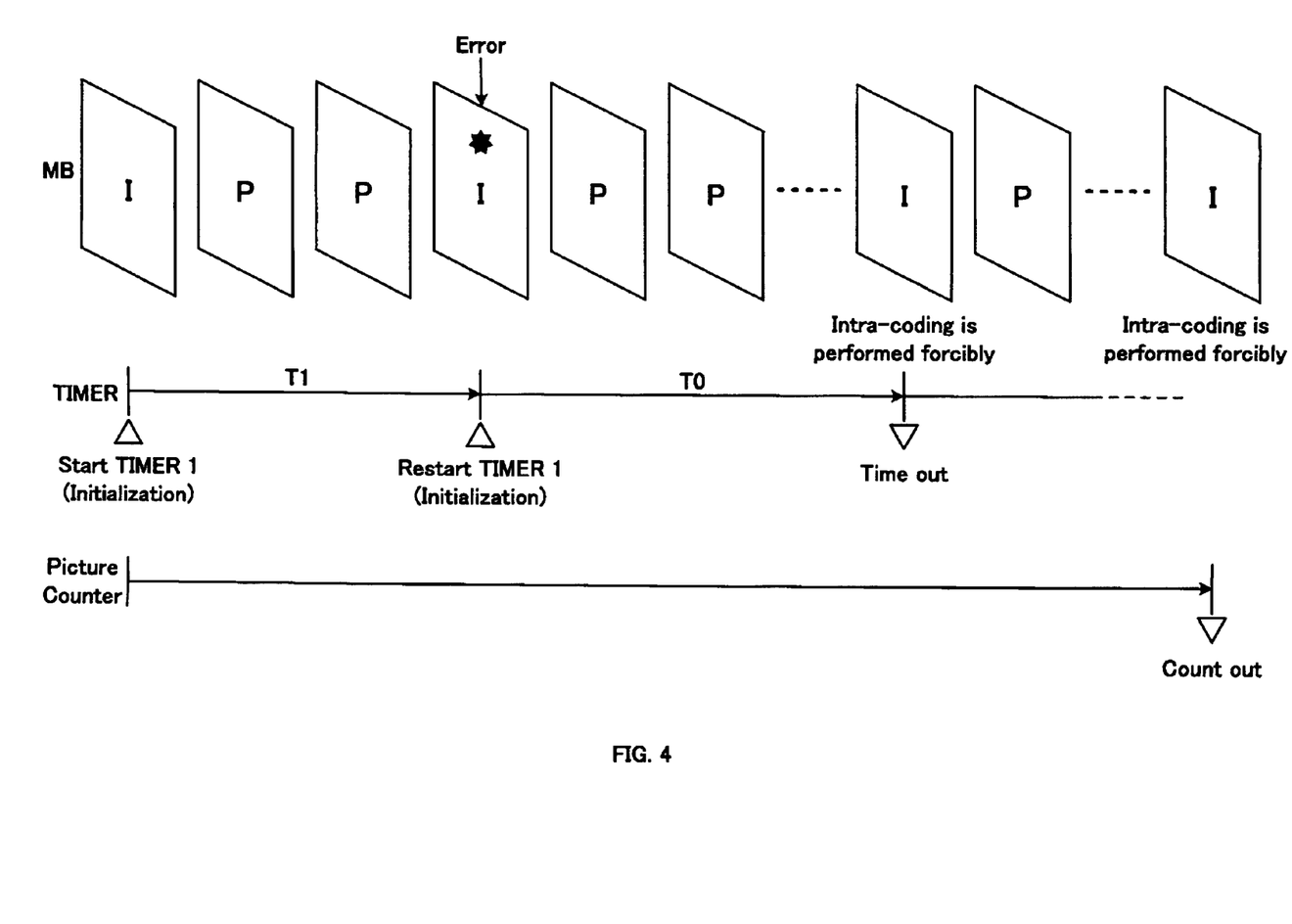
FIG. 4 shows a time chart showing an operation of the moving picture coding device.

As shown in FIG. 3, for example, assumed here is that an object in a picture moves, and the picture of a specific macroblock is thus changed to a background picture with no picture motion. In such a case, if such a state continues for 20 picture period, for example, the watchdog timer times out, and the macroblock is forcibly subjected to intra-coding. Therefore, as shown in FIG. 4, even if any error occurs to the intra-coded picture data I in a specific picture, and even if the inter-coding continues for a plurality of picture periods, the watchdog timer times out after the lapse of 20 picture period T0, and the macroblock is forcibly subjected to intra-coding.

As such, the problem that effects of picture error occurred at the time of intra-coding or the following inter-coding remain for a long time is solved, thereby favorably preventing picture degradation.

Assumed here is that the cumulative timer in the second timer section 10 times out when the watchdog timer is in the counting operation. With this being the case, the procedure moves from step 2h to 2i, and the coding mode determination section 7 determines the coding mode for the corresponding macroblock to the intra-coding. Thereafter, the corresponding macroblock is subjected to intra-coding. That is, if any large motion is observed in an picture, and if such a state continues for 3 picture periods successively or intermittently, for example, the intra-coding is forcibly executed irrespective of the externally-specified picture coding type, of without waiting the watchdog timer to time out.

Accordingly, with the intra-coding performed based on the picture motion, any picture in the error-affected macroblock can be refreshed as soon as possible. Moreover, as described above, this intra-coding is performed when the state of large picture motion lasts successively or intermittently for three picture periods. Therefore, compared with a case where the intra-coding is performed right after any picture change is observed irrespective of the picture change size, or a case where the intra-coding is performed right after any large picture change is observed, the frequency of intra-coding can be reduced so that the coding efficiency can be kept high.

In this embodiment, as shown in FIG. 4, a picture counter is provided to count the number of pictures for use as coding targets. When the count value reaches a predetermined value, e.g., 132 pictures, the picture coding type is set to a picture, thereby forcibly refreshing every macroblock of the picture.

Therefore, when an picture is observed with a small motion when P pictures are in a row, i.e., when the first and second timer sections 9 and 10 do not time out for a long time, the macroblock is forcibly subjected to intra-coding with the cycle of 132 pictures. Therefore, the error accumulation as a result of successive pictures is cancelled out with the cycle of 132 pictures with certainty so that the picture quality can be retained high.

Note here that the present invention is not restrictive to such an embodiment. In the embodiment, described is the case that the watchdog timers are used, and the count value of the watchdog timers is initialized every time the number of the DCT coefficients takes a value other than "0", i.e., every time any motion is observed in the picture. This is surely not restrictive, and alternatively, when the number of the DCT coefficients takes a value other than "0", the count value of the timer may not be initialized but kept as it is, and when the number of the DCT coefficients takes the value of "0", the count value may be started to be counted down again. That is, the accumulation time during when the picture is observed with no motion is counted by the timer, and when the accumulation time reaches a predetermined time, the timer is timed out for intra coding.

In the above embodiment, described is the case that the timer of the first timer section 9 is made to count down when the number of the DCT coefficients takes a value of "0", i.e., when an picture of the target macroblock is a still picture. Alternatively, in consideration of any effects such as quantization error, the determination threshold value for use for the number of the DCT coefficients may be set to any arbitrary value equal to or larger than "1". The target macroblock may be regarded as a still picture even if it is more or less subjected to differential coding, and the watchdog timer of the first timer section 9 may be made to count down.

In this manner, the intra-coding for refreshing is performed more frequently, and thus the following effects can be achieved. That is, when a difference is coded by the quantization error or others in the past, or when any pixel error occurs in a macroblock perceived with only a slight change in pixel value, there may be a case where the pixel value is hardly updated but the error remains. However, thanks to the configuration that if the macroblock is the one having been subjected to the differential coding but is observed with a small pixel change, the macroblock is regarded as a still picture so that the timer is made to count down. Accordingly, the picture quality can be prevented from being lowered by resolving residual pixel errors in the early stages.

Further, in the above embodiment, exemplified is the case where the first and second timer sections 9 and 10 are operated to count down with a picture cycle. Alternatively, a clock generator may be provided to generate clocks with a cycle different from the picture cycle, and the first and second timer sections 9 and 10 may be configured to count down by the clocks generated by the clock generator.

In the above embodiment, every macroblock in a picture is compulsory subjected to intra-coding based on timeout. Alternatively, any specific target macroblock may be selected from a picture, and only this selected macroblock may be compulsory subjected to intra coding based on timeout. More in detail, only the brightness components of the macroblocks may be focused attention, and any macroblock whose brightness components are equal to or larger than a threshold value may be selected. In this manner, only macroblocks visible to viewers may be forcibly subjected to intra coding based on timeout. This enables to increase the coding efficiency with the coding amount decreased while the picture quality is kept for practical use.

As means for determining whether there is any picture motion or not, other than comparing the number of the DCT coefficients with the threshold value, the value of the DCT coefficient may be compared with the threshold value. Alternatively, any parameter other than the DCT coefficient may be used as long as the parameter represents the picture motion.

Furthermore, in the above embodiment, exemplified is the case that the components of the moving picture coding device are configured by hardware or a DSP (Digital Signal Processor). Alternatively, the components may surely be entirely or partially implemented by software.

Moreover, the count values of the watchdog timers of the first timer section 9, and the count values of the cumulative timers of the second timer section 10 are not restrictive to "20" and "3", respectively, and may be set to any other arbitrary numbers. The size relationship between the count value of the first timer section 9 and that of the second timer section 10 can be also arbitrarily set.

Other than that, the means for detecting any picture motion, the procedure for coding control and the details thereof, the configuration of the moving picture coding device, and the like, can be variously modified without departing from the scope of the invention.

While the invention has been described in detail, the foregoing description is in all aspects illustrative and not restrictive. It is understood that numerous other modifications and variations can be devised without departing from the scope of the invention. The components appeared in the foregoing description can be arbitrarily combined for various other modifications and variations, e.g., some components are not necessarily provided or any other components may be provided for combination with those appeared in the foregoing description.

What is claimed is:

1. A moving picture coding apparatus comprising a processor which operates as sections comprising:
    a dividing section configured to divide each of a plurality of pictures input in chronological order into a plurality of blocks;
    a calculating section configured to calculate a discrete cosine transform (DCT) coefficient by performing a DCT on differential picture data between each of the blocks and a prediction picture obtained by motion compensation prediction;
    a first determining section configured to determine whether the DCT coefficient is less than or equal to a first threshold;
    a first measuring section configured to measure, for each of the blocks, a duration of time that the first determining section successively determines that the DCT coefficient is less than or equal to the first threshold;
    a second determining section configured to determine whether the duration of time has reached a predetermined first determination value;
    a first coding control section configured to perform intra-coding on a block for which the second determining section has determined that the duration of time has reached the first determination value;
    a third determining section configured to determine, for each of the blocks, whether the DCT coefficient exceeds a second threshold larger than the first threshold;
    a second measuring section configured to measure, for each of the blocks, a duration of time that the third determining section determines that the DCT coefficient exceeds the second threshold;
    a fourth determining section configured to determine whether the duration of time measured by the second measuring section has reached a predetermined second determination value; and
    a second coding control section configured to perform intra-coding on a block for which the fourth determining section has determined that the duration of time measured by the second measuring section has reached the second determination value.

2. The moving picture coding apparatus according to claim 1, wherein the first measuring section measures the duration of time, the duration of time being a duration of time that the DCT coefficient remains less than or equal to the first threshold value continuously for a predetermined period of time or longer over a plurality of picture periods.

3. The moving picture coding apparatus according to claim 1, wherein:
    the first measuring section includes a watchdog timer which updates a time value each time the first determining section determines that the DCT coefficient is less than or equal to the first threshold, resets the time value each time the first determining section determines that the DCT coefficient exceeds the first threshold, and stops updating the time value if the time value reaches a predetermined time value, and
    the second determining section determines that the duration of time has reached the first determination value if the watchdog timer stops updating the time value.

4. The moving picture coding apparatus according to claim 1, wherein the first measuring section measures a cumulative value of periods in which the DCT coefficient is equal to or less than the first threshold over a plurality of picture periods.

5. The moving picture coding apparatus according to claim 4, wherein:
    the first measuring section includes a cumulative timer which updates a time value each time the first determining section determines that the DCT coefficient is less than or equal to the first threshold, refrains from updating the time value if the first determining section determines that the DCT coefficient exceeds the first threshold, and stops updating the time value if the time value reaches a predetermined time value, and
    the second determining section determines that the duration of time has reached the first determination value if the cumulative timer stops updating the time value.

6. The moving picture coding apparatus according to claim 1, wherein the first coding control section includes:
    a selecting section for selecting a block of interest from the plurality of blocks; and
    an intra-coding section for performing intra-coding on the selected block of interest if the second determining section determines, for the block of interest, that the duration of time has reached the first determination value.

7. A moving picture coding apparatus comprising a processor which operates as sections comprising:
    a dividing section configured to divide each of a plurality of pictures input in chronological order into a plurality of blocks;
    a calculating section configured to calculate a discrete cosine transform (DCT) coefficient by performing a DCT on differential picture data between each of the blocks and a prediction picture obtained by motion compensation prediction;
    a first determining section configured to determine whether the DCT coefficient is less than or equal to a first threshold;
    a first counting section configured to count, for each of the blocks, a number of times the first determining section successively determines that the DCT coefficient is less than or equal to the first threshold;
    a second determining section configured to determine whether the number counted by the first counting section has reached a predetermined first determination value;

a first coding control section configured to perform intra-coding on a block for which the second measuring section has determined that the number counted by the first counting section has reached the first determination value;
a third determining section configured to determine, for each of the blocks, whether the DCT coefficient exceeds a second threshold larger than the first threshold;
a second counting section configured to count, for each of the blocks, a number of times that the third determining section determines that the DCT coefficient exceeds the second threshold;
a fourth determining section configured to determine whether the number counted by the second counting section has reached a predetermined second determination value; and
a second coding control section configured to perform intra-coding on a block for which the fourth determining section has determined that the number counted by the second counting section has reached the second determination value.

8. The moving picture coding apparatus according to claim 1, further comprising:
a counting section configured to count a number of the input pictures; and
a third coding control section configured to forcibly perform intra-coding on a block when the number counted by the counting section reaches a value corresponding to a duration of time greater than the first determination value.

9. The moving picture coding apparatus according to claim 2, further comprising:
a counting section configured to count a number of the input pictures; and
a third coding control section configured to forcibly perform intra-coding on a block when the number counted by the counting section reaches a value corresponding to a duration of time greater than the first determination value.

* * * * *